Aug. 16, 1938.                L. J. SMALLEN                2,127,146
                      ADJUSTABLE BROILER FOR RANGES
                        Filed May 25, 1935        4 Sheets-Sheet 1
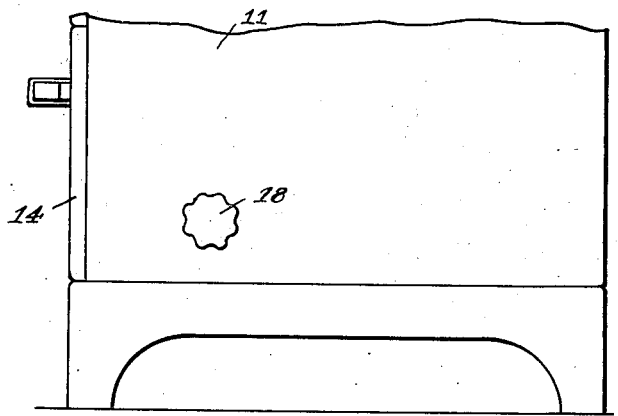
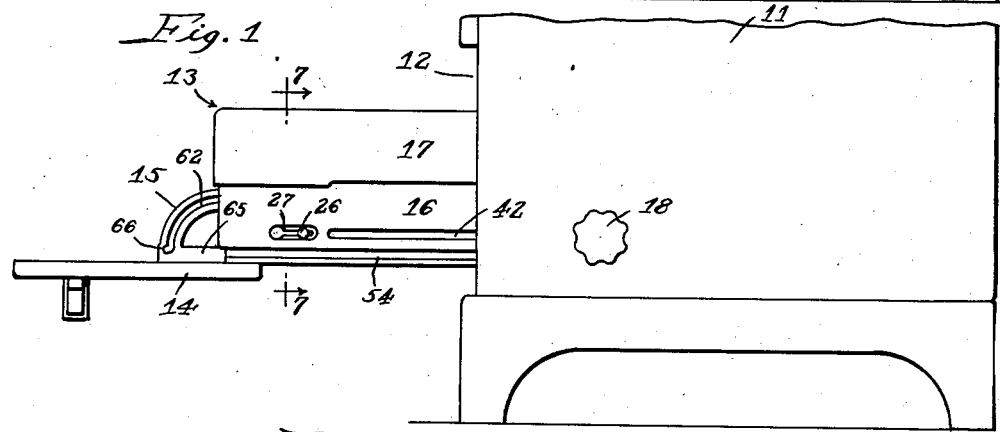
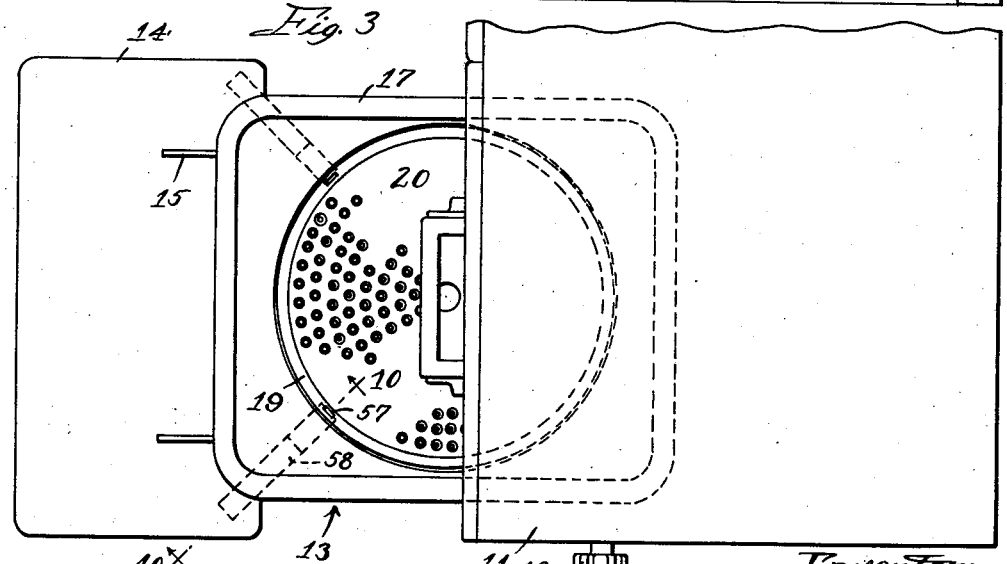

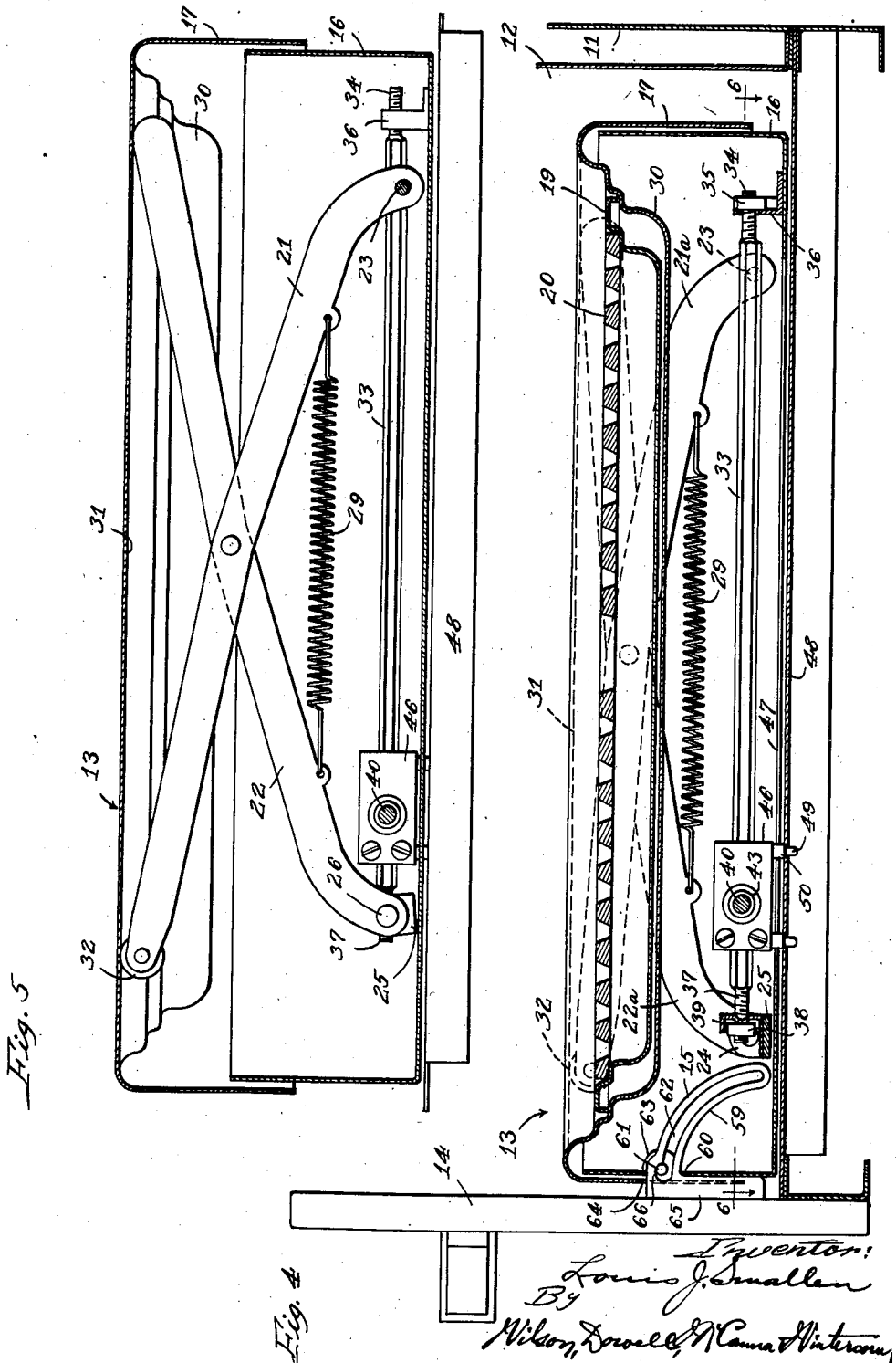

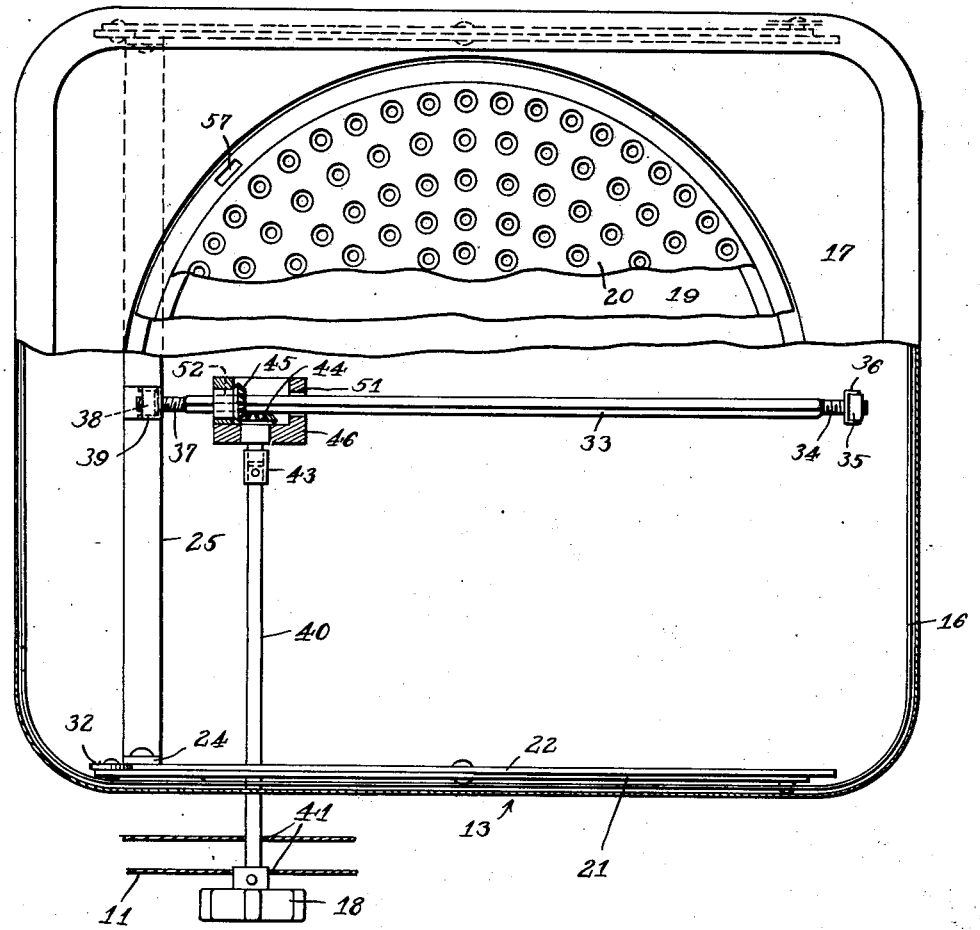

Aug. 16, 1938.                L. J. SMALLEN                2,127,146
                        ADJUSTABLE BROILER FOR RANGES
                         Filed May 25, 1935     4 Sheets-Sheet 4

Patented Aug. 16, 1938

2,127,146

UNITED STATES PATENT OFFICE 2,127,146

ADJUSTABLE BROILER FOR RANGES

Louis J. Smallen, Los Angeles, Calif.

Application May 25, 1935, Serial No. 23,344

16 Claims. (Cl. 126—41)

This invention relates to a novel adjustable broiler construction for ranges, permitting the raising and lowering of the broiler pan closer to or farther away from the heat source, as the cook may desire. While especially designed for use in domestic ranges of the cabinet type having the conventional oven and a broiler oven therebeneath, it should be understood that the present invention may be used in a separate broiler or in any similar appliance of any type, wherever the herein described adjustable device might be useful.

I am aware that numerous adjustable broilers have been devised, but believe that many of these have not been practical because of the exposure of the elevating mechanism permitting the grease to accumulate thereon and harden, and make for faulty operation and the necessity for too much labor to clean the same. The principal object of my invention is to provide a construction in which the operating mechanism is concealed and protected against spattering of grease thereon, and one in which the mechanism is of simple and inexpensive form and adapted to operate easily and quietly throughout the life of the range. As will presently appear, the adjustable broiler pan shelf covers and telescopes with the casing in which the elevating mechanism is housed, thus presenting flush external surfaces all of which may be easily cleaned, the shelf being furthermore easily removable when desired to further facilitate cleaning.

Another important object of this invention is to provide a broiler construction in which an operating knob on the outside of the broiler oven wall may be turned to raise or lower the broiler pan whether the broiler is in the oven or extended therefrom.

Still another object is to provide an improved elevating mechanism utilizing a lazy-tong structure embodied in such a way that operating stresses are equalized between two lazy-tongs at opposite sides of the pan, whereby to make for smooth and easy operation, spring means being further incorporating to counteract the gravitation in lowering the pan so that the broiler pan may be raised or lowered substantially with equal facility.

A still further object is to permit convenient removal of the broiler pan with the grill therein so that the broiled food may be served directly from the hot grill.

It will presently appear that a further object of this invention has been to provide a broiler unit adapted for use in any range, instead of requiring that it be built into and as a part of the general range construction.

The invention is illustrated in the accompanying drawings, in which—

Figure 1 is a side view of a portion of a range showing the broiler device of my invention extending therefrom with the door swung down;

Fig. 2 is a side view of the same range showing the door closed, the broiler having been pushed in;

Fig. 3 is a plan view of Fig. 1;

Fig. 4 is a longitudinal section through the broiler oven showing the telescoping box-like broiler drawer in longitudinal section and the elevating mechanism therein;

Fig. 5 is a view similar to Fig. 4 but showing the elevating mechanism in side elevation and showing the broiler pan shelf raised thereby;

Fig. 6 is partly a plan view of Fig. 4 and partly a horizontal section on the line 6—6 thereof;

Fig. 7 is a cross-section on the line 7—7 of Fig. 1, but showing the parts on the same scale as in Figs. 4 to 6;

Fig. 8 is a detail taken on the line 8—8 of Fig. 7;

Fig. 9 is a rear view of the broiler showing the supporting guides therefor, and Fig. 10 is a sectional detail on the line 10—10 of Fig. 3.

The same reference numerals are applied to corresponding parts throughout the views.

Referring to Figs. 1 to 3, 11 designates the oven section of a domestic range of the cabinet type having a broiler oven 12 beneath the gas burner or electric heating element, as the case may be, serving as the heat source for the baking oven. The adjustable broiler device of my invention indicated generally by the numeral 13 fits in the broiler oven and is movable like a drawer into and out of the oven with the door 14 serving as a closure for the open front end of the oven, as in Fig. 2, or as a supporting ledge or shelf when swung down to the horizontal position shown in Figs. 1 and 3, the door being hinged to the broiler device on arcuate hangers 15, to which further reference will be made later. The broiler device 13 is a box-like sheet metal structure consisting of lower and upper telescoping rectangular sections 16 and 17, respectively, the lower section 16 fitting within the upper section 17, and, as will presently appear, constituting the casing within which the elevating mechanism is housed. The elevating mechanism is manually operable from the side of the broiler oven by a rotatable knob 18 to raise or lower the upper section 17 with respect to the lower section 16, and accordingly bring the meat to be broiled closer to or farther away from the source of heat in the oven. The upper section 17 constitutes a shelf for supporting the removable broiler pan 19 and the grill 20 fitting therein. The knob 18, as will soon appear, may be operated to raise or lower the broiler pan when the broiler device is in any position, that is, whether it is in the oven or extended therefrom. It is apparent from the description thus far that I have provided a unique form of broiler, because the elevating mechanism is substantially completely concealed inside the telescoping sections 16 and 17, and hence is protected against having grease spattered thereon in the operation of the broiler. Furthermore, only smooth, flush surfaces that can be easily wiped clean are left exposed, and, as will presently appear, the upper section 17 is easily removable, if desired, to further facilitate cleaning, so that the housewife has no trouble keeping this broiler clean all over. In most other broilers with which I am familiar, only certain parts could be kept reasonably clean, the rest of the broiler could not be reached at all conveniently for cleaning; there were recesses which could not be gotten into and which collected grease. In such cases, the grease would harden and result in faulty operation. By enclosing and thus protecting the elevating mechanism against grease and heat, I insure easy and dependable operation throughout the life of the range.

The elevating mechanism operated by the knob 18 comprises two pairs of lazy-tongs 21—22 and 21a—22a extending lengthwise in the opposite sides of the lower section 16. The two pairs of tongs are pivoted to the side walls of the section 16 near the rear end thereof, as at 23, using levers 21 and 21a in such connection. The two pairs of tongs are interconnected by their levers 22 and 22a by pivotal connection with the upwardly bent ends 24 of a cross-member 25. The flat-headed studs 26 providing these pivotal connections project through horizontal slots 27 provided in the side walls of the section 16, whereby to support and guide the front end of the lazy-tong structure for back and forth movement. The side walls are depressed, as indicated, to accommodate the heads of the studs 26, and at the same time space the levers 22 and 22a properly with respect to the side walls of section 16. The forward ends of the slots 27 are enlarged, as at 28, to permit passage of the heads of the studs when the studs are being assembled in the slots. Springs 29 attached to the companion levers 21 and 21a and 22 and 22a serve normally to urge the levers toward vertical alignment, whereby to raise the upper free ends of said levers and accordingly raise the upper section 17 carrying the broiler pan. The top of section 17 is dished so as to define raised edge portions at the front and rear and opposed sides, as indicated in Fig. 3, and in the dished top is the depressed central portion 30 for the broiler pan. The raised lateral edge portions afford longitudinal ways 31 in which the upper ends of the lazy-tong levers engage. Rollers 32 are provided on the ends of the levers 21 and 21a to ride in the ways 31, whereby to eliminate friction and thus make for easier and quieter operation. The fact that the upper ends of the levers 22 and 22a remain practically stationary, like the pivoted rear ends of the levers 21 and 21a, makes it unnecessary to provide rollers at those points. The springs 29, it will of course be understood, are not relied upon to raise the upper section 17, but merely serve to counteract the tendency for gravitation of the section 17 with the broiler pan and grill thereon, so that it will require about the same force applied to the knob 18 to raise the broiler pan as it does to lower it. A hexagonal rod 33 extends longitudinally in the middle of the bottom of the lower section 16, and has the rear end 34 reduced and threaded right hand and received in a nut 35 held against turning in a small bracket 36 fixed to the bottom of the section 16. The front end 37 is reduced and threaded left hand and received in another nut 38 that is held against turning in a small bracket 39 projecting upwardly from the middle of the cross-member 25. Obviously, if the rod 33 is turned in a clockwise direction, looking at it from the front end 37 thereof, the cross-member 25 is pulled rearwardly with the nut 38 and rod 33, due to the fact that both of the nuts 35 and 38 are worked inwardly away from the ends of the threaded portions in such turning of the rod. Consequently, the broiler pan will be raised. Conversely the broiler pan will be lowered by counterclockwise rotation of the rod 33. The fact that the push and pull thrusts are applied at the middle of the cross-member 25, results in equalized application of force to the two lazy-tongs, and the broiler pan will accordingly be kept level at all times during raising or lowering. This construction furthermore avoids the likelihood of binding of the parts. The fact that the section 17 simply rests upon the lazy-tongs makes it an easy matter to remove it for cleaning. When this section is removed, the elevating mechanism in the lower section is, of course, fully exposed for inspection, cleaning and lubrication.

The elevating mechanism just described is operable by the knob 18 in any position of the broiler, that is, whether the broiler happens to be in the oven, as in Fig. 2, or is extending from the oven, as in Figs. 1 and 3. This is due to the fact that the knob has a sliding operating connection with the elevating mechanism. The knob is mounted on the outer end of a shaft 40 which extends through registering holes 41 in the side wall of the oven and through a longitudinal slot 42 in the side wall of the lower section 16, and is coupled as at 43 to a bevel gear 44 meshing with another bevel gear 45 in the housing 46. The latter extends through a longitudinal slot 47 in the bottom of the lower section 16 and rests upon a longitudinally extending channel member 48 in the bottom of the broiler oven, the housing having dowel projections 49 entered in holes 50 in the channel member 48 so as to hold the housing in position in the back and forth movement of the broiler with respect thereto. The hexagonal rod 33 passes freely through a hole 51 in one end of the housing 46, and has a sliding driving connection with the bevel gear 45 in a hexagonal hole 52 provided therein. It will, of course, be understood that a round rod might be used instead of the hexagonal rod 33, and in that case the bevel gear 45 would be splined on the rod for a sliding driving connection therewith. It is obvious that one may move the broiler in or out without disturbing the operating connection at 44—45 between the knob 18 and the elevating mechanism, thus permitting the operator to regulate the broiler pan elevation conveniently and intelligently as the broiling of the meat progresses; there is no uncertainty attached to making the adjustment as with many other broilers with which I am familiar, and the adjustments can be made as finely graduated as desired, as distinguished from the step-by-step adjustments of many other broilers. The results obtained will accordingly be better and there is less likelihood of burning or scorching. The slots 42 and 47 in the side and bottom walls of the lower section afford an opportunity for air circulation through this section to prevent overheating of the springs 29 and the rest of the elevating mechanism. Loose fit of the upper section 17 on the lower section also tends to promote air circulation.

The broiler is slidable on tracks 53 extending longitudinally in the bottom of the broiler oven on opposite sides of the channel member 48, as indicated in Fig. 9. The lower section 16 of the broiler has channel-shaped slides 54 secured to the bottom thereof receiving the tracks 53 in the manner shown, and downwardly projecting longitudinal flanges 55 are formed on these slides, in the right angle of which a pair of rollers 56, mounted on the tracks 53 at an angle of 45° to the vertical and horizontal, are arranged to operate, whereby to provide antifriction guiding and supporting means for the broiler. The rollers, by reason of their angularity, assume thrust in a vertical plane in supporting the broiler, and assume thrust in a horizontal plane in guiding the broiler in the longitudinal movement thereof into and out of the broiler oven. The simplicity and economy of the construction is self-evident, and it is also obvious that it makes for easy and quiet operation.

The broiler pan 19 is arranged to be removed from the broiler with the grill so that the broiled meats may be served right from the hot grill, which is most appetizing. The pan has two slots 57 provided in the marginal portion thereof in circumferentially spaced relation, as clearly appears in Fig. 3, and lifters 58 are arranged to be inserted in these slots in the manner illustrated in Fig. 10 and indicated in dotted lines in Fig. 3, whereby to remove the pan and its contents, and support the same securely with two hands in carrying it to the serving table. In that way a sizzling steak can be served without having to transfer the steak from the original grill onto a specially prepared hot plate, and this method is not only more appetizing but does not involve the dirtying of extra articles that will require washing later. The increased efficiency is quickly appreciated by the housewife.

The door 14 has hangers 15 of novel form hingedly connecting the same to the broiler. In Fig. 4 I have shown how the arcuate portion 59 of each hanger extends through an opening 60 in the front wall of the lower section 16 and slidably receives a stud 61 in the arcuate slot 62, the stud being mounted on an ear 63 bent inwardly from the front wall of section 16. A vertical slot 64 is formed in the front wall of the upper section 17 to accommodate that portion 65 of the hanger which is fastened to the door. In the upright position of the door, the studs 61 enter recesses 66 in the ends of the slots 62 in the hangers 15, and the portions 65 of the hangers bear against the front wall of the lower section 16 of the broiler, as clearly appears in Fig. 4. The door then constitutes, in effect, the front of a drawer, the broiler 13 being slidable with the door into and out of the oven, like a drawer. The door can be swung down easily to the position shown in Fig. 1 by simply raising it slightly so as to disengage the studs 61 from the depressions 66. In the lowered position of the door, the portions 65 of the hangers 15 bear against the bottom of the lower section 16, as shown in Fig. 1, and, of course, the studs 61 are engaged in the ends of the slots 61 remote from the depressed ends 66. The construction is obviously simple and economical, and at the same time thoroughly practical for the purpose intended.

It is believed the foregoing description conveys a good understanding of all of the objects and advantages of my invention. It should be evident from this disclosure that the broiler may be applied to practically any range, because no special construction is required in the range to accommodate the broiler. Various changes may be made without departing from the spirit and scope of the invention. For example, I may employ cams or other means to obtain the results obtained here with the rod 33 threaded reversely at opposite ends. Also, while a round grill is shown with a round broiler pan, an elongated, rectangular, or square form of grill and/or pan may be used. Furthermore, while bevel gears are shown at 44—45, a worm and worm gear or any other suitable driving connection may be employed. The appended claims have been drawn with a view to covering all legitimate modifications and adaptations.

I claim:
1. In combination with a broiler compartment of a range, a broiler device slidable into and out of said compartment, said device comprising a sub-structure and a broiler pan support vertically adjustable relative thereto, elevating means movable with said device for adjusting and supporting said broiler pan support at different elevations relative to the sub-structure, and relatively stationary manually operable means on the range having a sliding connection with said elevating means for operating the same in any position to which the broiler device may normally be moved in or out relative to the broiler compartment.

2. In combination with a broiler compartment of a range, a drawer movable into and out of the broiler compartment, a broiler pan member on the drawer, said member having marginal portions extending downwardly in enclosing telescoping relation with the drawer, and means whereby said member is arranged to be adjusted vertically to different elevations with respect to the drawer.

3. In combination with a broiler compartment of a range, a drawer movable into and out of the broiler compartment, a broiler pan member carried by the drawer and having downwardly extending marginal portions in telescoping relation with the margins of the drawer to cover the same, and means supporting the member on the drawer for vertical adjustment relative to the drawer, the marginal portions of said member extending downwardly sufficiently in relation to the range of vertical adjustment of the member to maintain telescoping relation with the drawer throughout the range of adjustability of the member.

4. In combination with a broiler compartment of a range, a drawer movable into and out of the broiler compartment, the drawer having a longitudinal slot in its side wall, a broiler pan member on the drawer serving as a cover therefor, elevating mechanism in the drawer for adjustably supporting the broiler pan member at different elevations with respect to the drawer, and manually operable means stationarily mounted with respect to the broiler compartment and extending from the side of the range and through the longitudinal slot and having a sliding driving connection with the elevating mechanism therein.

5. In a device of the character described, a broiler drawer comprising a bottom, and front, rear, and opposed side walls extending upwardly from said bottom, and a broiler pan member covering the top of the drawer and having front, rear, and opposed side walls extending downwardly therefrom in telescoping relation with the corresponding walls of the drawer at the outer sides of said corresponding walls of the drawer to partially enclose the same.

6. In a device of the character described, a broiler drawer comprising a bottom, and front, rear, and opposed side walls extending upwardly from said bottom, and a broiler pan member covering the top of the drawer and having front, rear, and opposed side walls extending downwardly therefrom in telescoping relation with the corresponding walls of the drawer, said broiler pan member having a dished top bounded at the front and rear and opposed lateral edges by raised edge portions, the dished top having a depressed portion adapted to receive a broiler pan.

7. In a device of the character described, a broiler drawer comprising a bottom, and front, rear, and opposed side walls extending upwardly from said bottom, a broiler pan member covering the top of the drawer and having front, rear, and opposed side walls extending downwardly therefrom in telescoping relation with the corresponding walls of the drawer, said broiler pan member having a dished top bounded at the front and rear and opposed lateral edges by raised edge portions, the dished top having a depressed portion, a removable broiler pan in said depressed portion, the broiler pan having a depressed portion, and a removable broiler grill in the depressed portion of the broiler pan.

8. In combination with a broiler compartment of a range, a broiler unit movable into and out of the compartment, said unit comprising a box-like structure composed of telescoping upper and lower sections, and means in the lower section supporting the upper section for vertical adjustment relative to the lower section.

9. In combination with a broiler compartment of a range, a broiler unit movable into and out of said compartment, said unit comprising a box-like structure comprising upper and lower telescoping sections, the lower section fitting inside the upper section, a pair of pivoted criss-crossed lazy-tong levers disposed lengthwise on each side of and within the lower section, the lower end of one of the levers of each pair being pivoted to the side wall of the lower section, a cross-member interconnecting the lower ends of the other levers, the upper section being supported at opposite sides on the upper ends of said levers, and means operatively connected with the cross-member intermediate the ends thereof for adjusting the same fore and aft with respect to the lower section, whereby to raise and lower the upper section.

10. In combination with a broiler compartment of a range, a broiler unit movable into and out of said compartment, said unit comprising a box-like structure comprising upper and lower telescoping sections, a pair of pivoted criss-crossed lazy-tong levers disposed lengthwise on each side of and within the lower section, the lower end of one of the levers of each pair being pivoted to the side wall of the lower section, the side walls of the lower section having slots, means slidably supporting and guiding the lower ends of the other levers in said slots, the upper section being supported at opposite sides on the upper ends of said levers, and means for simultaneously communicating fore and aft movement to the slidable ends of said levers.

11. In combination with a broiler compartment of a range, a broiler unit movable into and out of said compartment, said unit comprising a box-like structure comprising upper and lower telescoping sections, a pair of pivoted criss-crossed lazy-tong levers disposed lengthwise on each side of and within the lower section, the lower end of one of the levers of each pair being pivoted to the side wall of the lower section, spring means acting between the two levers of each pair tending normally to urge the same toward vertical alignment, and counterbalance the weight of the upper section in various positions of adjustment of said levers, the upper section being supported at opposite sides on the upper ends of said levers, and means for simultaneously communicating fore and after adjustment to the lower ends of the other levers relative to the lower section.

12. In combination with a broiler compartment of a range, a broiler unit movable into and out of said compartment, said unit comprising a box-like structure including upper and lower telescoping sections, a pair of pivoted criss-crossed lazy-tong levers disposed lengthwise on each side of and within the lower section, the lower end of one of the levers of each pair being pivoted to the side wall of the lower section, a cross-member interconnecting the lower ends of the other levers, the upper section being supported at opposite sides on the upper ends of said levers, a push and pull member extending lengthwise in the middle of the lower section and anchored at one end to the lower section and at the other end to the middle of the cross-member, said push and pull member being operatively connected with the cross-member so that when turned in one direction it communicates forward movement to the cross-member and when turned in the other direction it communicates rearward movement to the cross-member, and means operable from the outside of the lower section for actuating the push and pull member.

13. In combination with a broiler compartment of a range, a broiler unit movable into and out of said compartment, said unit comprising a box-like structure including upper and lower telescoping sections, a pair of pivoted criss-crossed lazy-tong levers disposed lengthwise on each side of and within the lower section, the lower end of one of the levers of each pair being pivoted to the side wall of the lower section, a cross-member interconnecting the lower ends of the other levers, the upper section being supported at opposite sides on the upper ends of said levers, a member extending lengthwise in the section, means for anchoring the last mentioned member at one end to the lower section and at the other end to the middle of the cross-member, said last mentioned member having its opposite ends threaded right and left hand, respectively, the anchorage means at said ends including nuts threaded on said ends, and means operable from the outside of the lower section at one side thereof for communicating rotation to the said last mentioned member, said means including a right angle gearing connection with said member.

14. In combination with a broiler compartment of a range, a broiler unit movable into and out of said compartment, said unit comprising a box-like structure including upper and lower telescoping sections, a pair of pivoted criss-crossed lazy-tong levers disposed lengthwise on each side of and within the lower section, the lower end of one of the levers of each pair being pivoted to the side wall of the lower section, a cross-member interconnecting the lower ends of the other levers, the upper section being supported at opposite sides on the upper ends of said levers, a member extending lengthwise in the middle of the lower section, means for anchoring the last mentioned member at one end to the lower section and at the other end to the middle of the cross-member, said last mentioned member having its opposite ends threaded right and left hand, respectively, the anchorage means including nuts threaded on said ends, a support stationary with respect to the broiler compartment, a pair of intermeshing bevel gears on said support one of which has a sliding driving connection with the push and pull member, and a shaft extending from the other of said gears laterally from the lower section and having an operating knob on the end thereof manually operable from the side of the range.

15. In a broiler device of the character described, a vertically adjustable broiler pan support having a depression therein, a broiler pan fitting removably in said depression, said pan comprising a marginal portion bounding a depressed portion wherein a broiler grill is adapted to fit, and a removable broiler grill in said depressed portion, the marginal portion of said pan having slots provided therein in a predetermined spaced relation, and adapted to detachably receive manual lifters.

16. A broiler drawer construction comprising, a lower section having upturned marginal flanges, and an upper section shiftable vertically with respect to the lower section and having downturned marginal flanges extending downwardly over the flanges of the lower section in telescopic relation thereto.

LOUIS J. SMALLEN.